US008056201B1

(12) United States Patent
Murphy

(10) Patent No.: US 8,056,201 B1
(45) Date of Patent: Nov. 15, 2011

(54) APPARATUS FOR INSTALLING PIN TO ALIGNED GUARD/SHAFT ASSEMBLY

(75) Inventor: Brian P. Murphy, Burlington, NC (US)

(73) Assignee: Honda Motor Co., Ltd., Tokyo (JP)

(*) Notice: Subject to any disclaimer, the term of this patent is extended or adjusted under 35 U.S.C. 154(b) by 422 days.

(21) Appl. No.: 12/415,656

(22) Filed: Mar. 31, 2009

(51) Int. Cl.
*B23P 19/10* (2006.01)
*B25B 27/00* (2006.01)

(52) U.S. Cl. ............................ 29/244; 29/281.1; 29/464

(58) Field of Classification Search .................... 29/244, 29/251, 252, 237, 281.1, 283, 464, 468, 525.01; 227/140, 154
See application file for complete search history.

(56) References Cited

U.S. PATENT DOCUMENTS

| | | | | |
|---|---|---|---|---|
| 1,791,967 | A * | 2/1931 | Mansfield | 227/116 |
| 3,390,446 | A | 7/1968 | Ettore | |
| 4,380,107 | A | 4/1983 | Andress | |
| 4,558,502 | A | 12/1985 | Gossmann et al. | |
| 5,067,231 | A | 11/1991 | Ueno et al. | |
| 7,398,584 | B2 | 7/2008 | Katou | |

* cited by examiner

*Primary Examiner* — David B Thomas
(74) *Attorney, Agent, or Firm* — Standley Law Group LLP

(57) ABSTRACT

A device for inserting a pin into an apertured shaft having an apertured guard which includes a mission plate and an adjacent press fixture mounted to a mounting plate. The press fixture is adapted to receive and hold the apertured shaft and apertured guard. An alignment pin extends from the press fixture for insertion into the apertured shaft and apertured guard once the apertures in the shaft and guard have been vertically aligned. A press head is affixed atop the press fixture and adapted to insert a pin into the vertically aligned apertures of the apertured shaft and apertured guard.

21 Claims, 10 Drawing Sheets

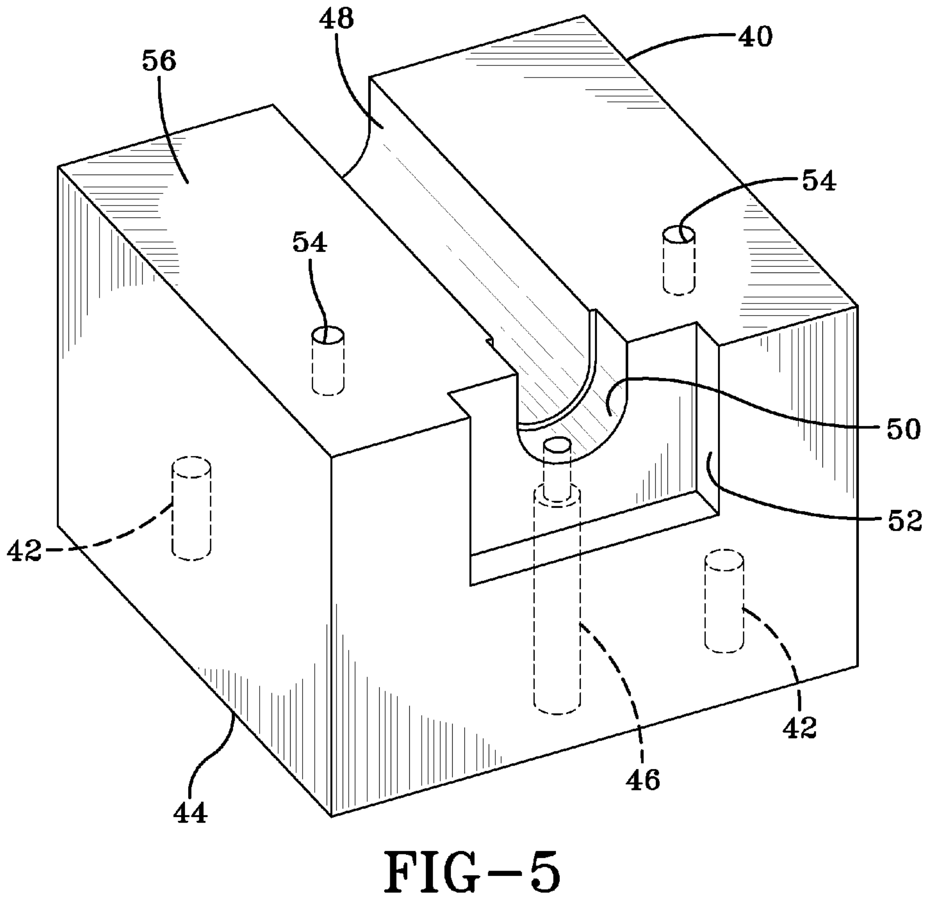
FIG-5
FIG-6
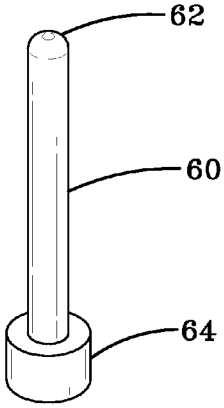

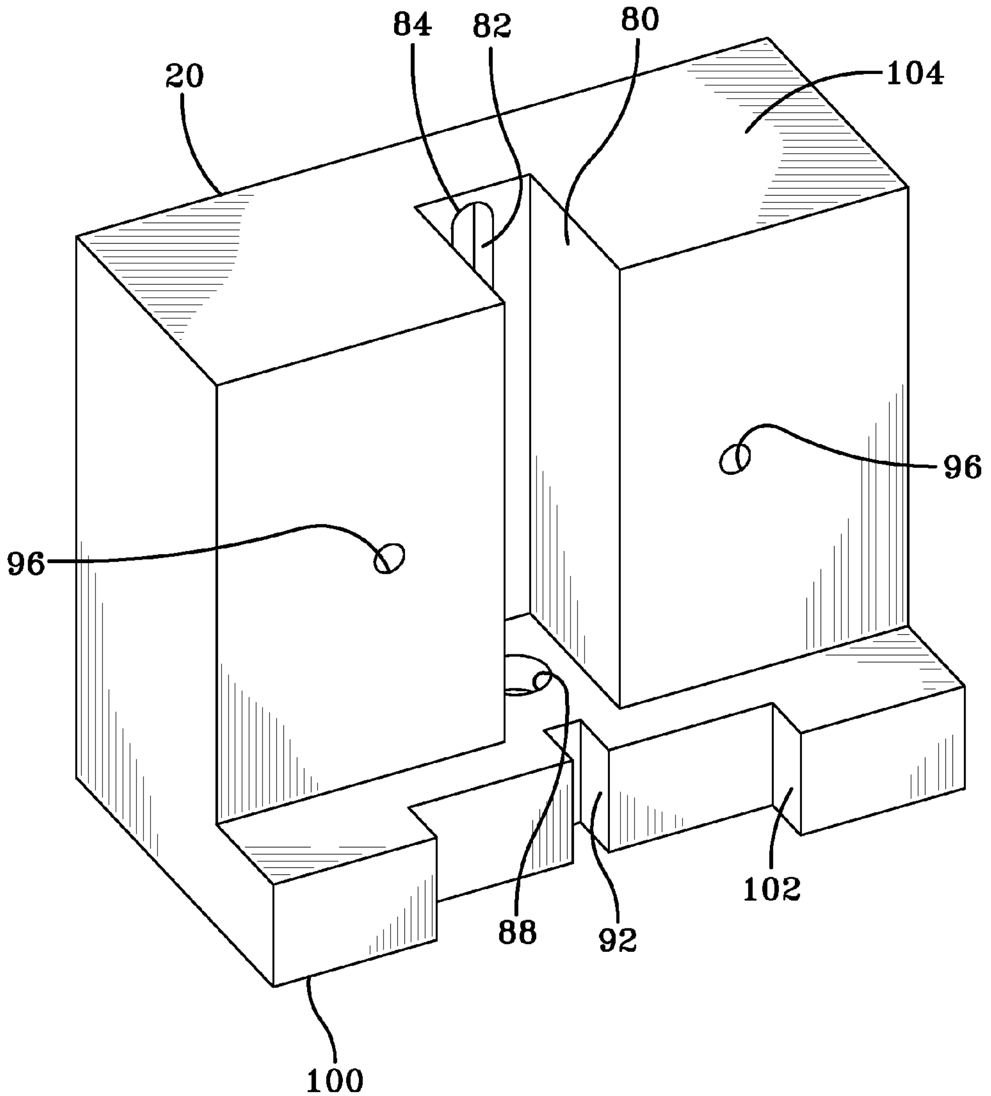
FIG−9

APPARATUS FOR INSTALLING PIN TO ALIGNED GUARD/SHAFT ASSEMBLY

BACKGROUND OF THE INVENTIVE FIELD

The present invention is directed to an apparatus for inserting a pin into at least one apertured member. More particularly, exemplary embodiments of the present invention are directed to an apparatus for inserting a pin into an apertured shaft having an apertured guard, wherein the apertured shaft and apertured guard are aligned to allow insertion of the pin therein.

The attachment of guards, collars, or other like devices to a cylindrical body using a press-fit pin is well known in the art of engine, drive train, or other power equipment manufacturing. For example, a lawn mower transmission having an axle extending therefrom may have a guard placed around the axle to prevent grass or other foreign objects from entering the transmission.

In a drive train manufacturing environment, such attachment of a guard to a shaft may occur in an assembly room or other like area. Because of the need to maintain a production pace, it must be ensured that attachment of the guard to the shaft using a press-fit pin is easily accomplished and repeatably accurate.

Various methods and devices have, therefore, been developed to attach a guard to a shaft using a press-fit pin. Unfortunately, the devices and methods known to the inventor suffer from various deficiencies. For example, known devices do not provide for a repeatably accurate pin insertion, nor do they provide the user with an easy means of aligning the shaft and guard for pin insertion.

It should also be realized that maintaining alignment of the shaft and guard during the pressing action can be difficult. Specifically, the geometry of cylindrical bodies, such as an apertured shaft and corresponding apertured guard, makes it difficult to maintain alignment during press pin insertion. Unfortunately, the inventor has observed that this difficulty in maintaining alignment often interferes with proper pin insertion into the shaft and guard and thus creates a nonexistent or ineffective attachment between the shaft and guard.

Consequently, it can be understood from the forgoing discussion that it would be desirable to provide a device for aligning the apertures in a shaft and associated guard that overcomes the aforementioned deficiencies. A device of the present invention addresses these problems.

SUMMARY OF THE GENERAL INVENTIVE CONCEPT

An apparatus of the present invention takes the form of a press block that includes a mission plate and a press fixture secured to a mounting plate that is adapted for removable attachment to a work surface. A press head located on top of the press fixture extends upward and is adapted to insert a pin into an apertured shaft and apertured guard secured by the press fixture.

The press fixture includes a shaft guide having a contoured end portion for positioning of an apertured shaft and guard. A spring loaded, retractable alignment pin protrudes through the press fixture and into the shaft guide to lock the apertured shaft and apertured guide into proper position for pin insertion.

The press head includes a pin pusher, interposed between a pin block and a cover plate. The pin pusher includes a pin pusher arm that extends downward for engagement with the pin to be inserted into the apertured shaft and guard. A pin pusher guide located in the pin block, slidably receives the pin pusher. The pin pusher guide also includes a mechanical stop limiting the vertical movement of the pin pusher.

As a force is applied to the pin pusher, the pin pusher moves downward through the press head. The pin pusher arm extends into the pin guide and engages the pin for insertion. Upon engagement, the pin is forced downward into the vertically aligned apertures of the apertured shaft and aperture guard, which are locked in place by the press fixture. As the pin is inserted into the aligned apertures, the spring loaded alignment pin is forced into the press fixture. The mechanical stop halts the downward motion of the pin, ensuring a repeatably accurate pin insertion.

As described in more detail below, the design of the press block of the present invention assists with vertically aligning the apertured shaft and guard, and locks the apertured shaft and guard in place to minimize movement thereof during pressing. Therefore, an apparatus of the present invention overcomes the deficiencies of existing press blocks and pin insertion methods known by the inventor.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 5 is a perspective view of an exemplary embodiment of a main block of the press block of FIG. 1;

FIG. 6 is a perspective view of an exemplary embodiment of a alignment pin of the press block of FIG. 1;

FIG. 9 is a perspective view of an exemplary embodiment of a pin block of the press block of FIG. 1;

DETAILED DESCRIPTION OF EXEMPLARY EMBODIMENT(S)

Figure 1:
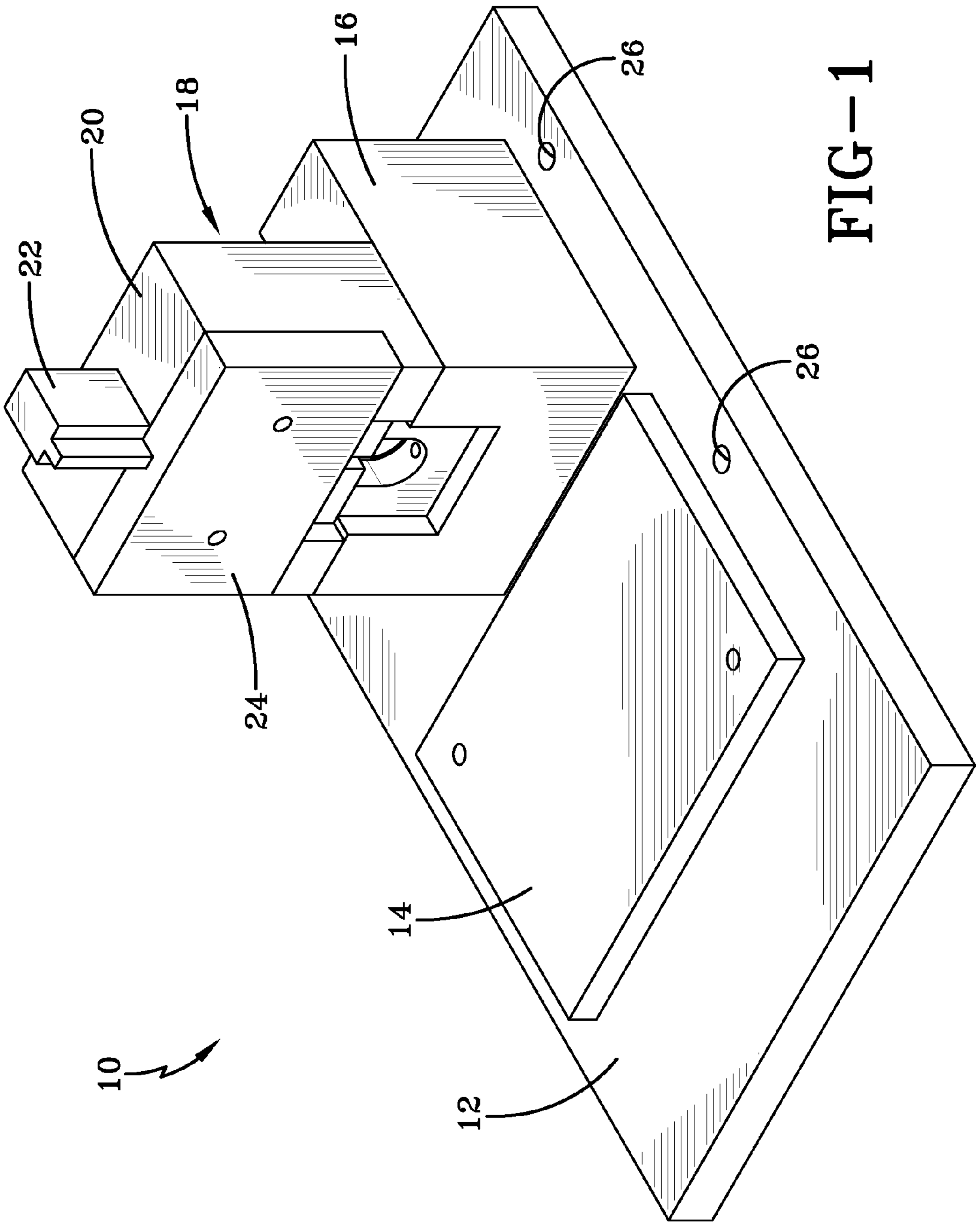
FIG. 1 is a perspective view of an exemplary embodiment of a press block for press-fitting a pin into an apertured shaft and guard.
Figure 2:
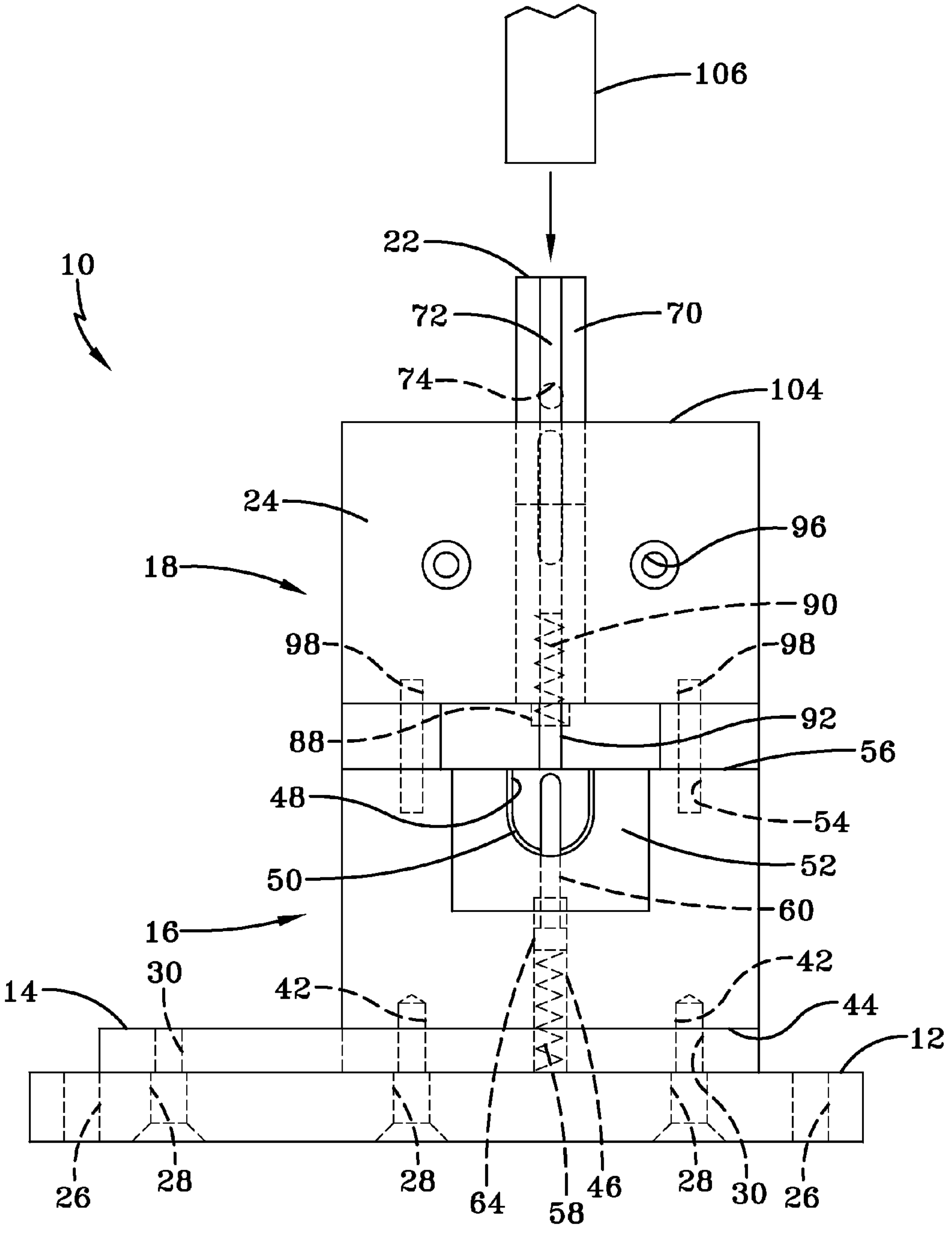
FIG. 2 is a front view of the press block of FIG. 1.

An exemplary press block 10 of the present invention is illustrated in FIG. 1, and is depicted in more detail in the rendered assembly view of FIG. 2 and in the component drawings of FIGS. 3-12. As shown, the press block 10 includes a mounting plate 12 having a mission plate 14 and a press fixture 16 attached to the top surface thereof. The press fixture 16 and the mission plate 14 are mounted adjacent one another on the mounting plate 12. A press head 18 is attached to the top surface of the press fixture 16. The press head 18 includes a pin block 20, a pin pusher 22, and a cover plate 24. The pin block 20 and cover plate 24 cooperate to slidably receive the pin pusher 22. Location apertures 26 are located in the mounting plate 12, the purpose of which is described in more detail below.

Figure 3:
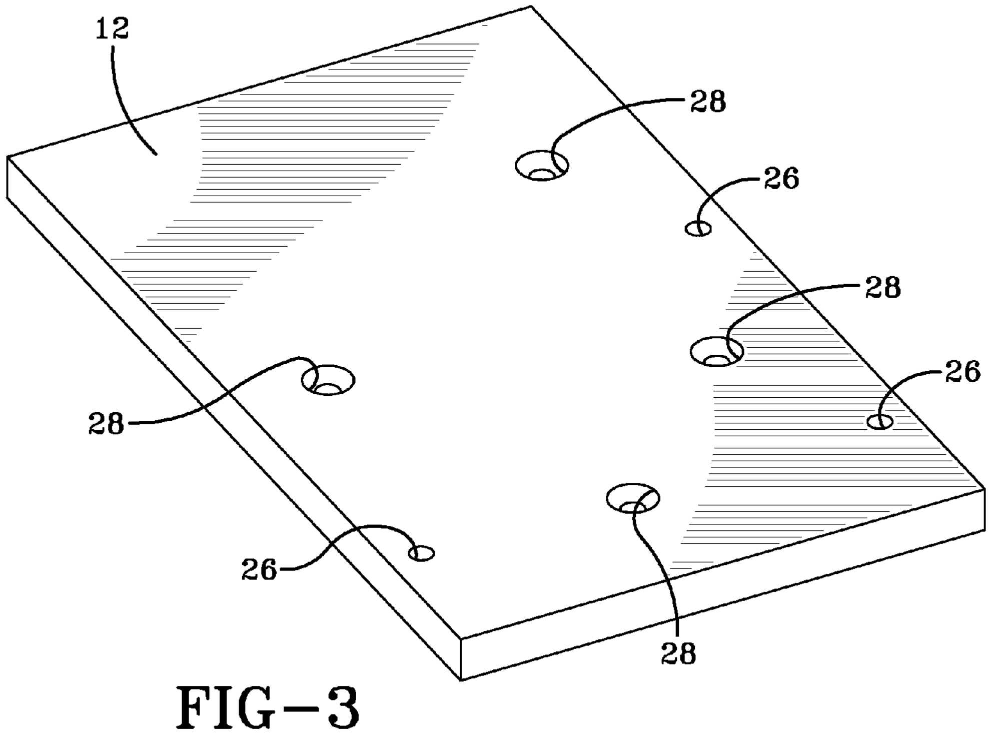
FIG. 3 is a perspective view of an exemplary embodiment of a mounting plate of the press block of FIG. 1.

The mounting plate 12 of the exemplary press block 10 is depicted in FIG. 3. The mounting plate 12 includes a number of mounting apertures 28 through which the mission plate 14 and the press fixture 16 may be attached to the mounting plate by mechanical fasteners. The apertures 28 may be countersunk to allow the mounting plate 12 to lay flat on a support structure (not shown in the Figures). The mounting apertures 28 may be arranged at various locations on the mounting plate 12 to accommodate a variety of mission plates 14 and press fixtures 16. Although the use of mechanical fasteners is contemplated, it should be understood by those skilled in the art that other forms of attachment may be suitable, such as welding, adhesives, etc.

The location apertures 26 of the mounting plate 12 may be used to securely position or fasten the mounting plate to a support structure (not shown in the Figures). Various techniques of positioning and securing the mounting plate 12 to a support surface utilizing the location apertures 26 would be known to those skilled in the art. For example, methods such as pins and easily removable mechanical fasteners may be used.

Figure 4:
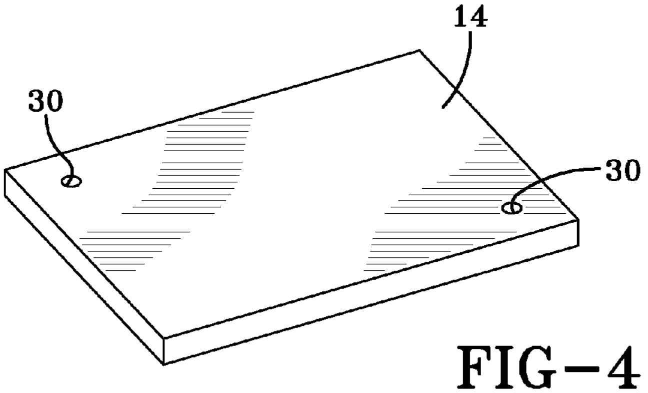
FIG. 4 is a perspective view of an exemplary embodiment of a mission plate of the press block of FIG. 1.

FIG. 4 illustrates a mission block 14 of the exemplary press block 10. The mission block 14 includes mounting apertures 30. The mounting apertures 30 are located to align with the mounting apertures 28 in the mounting plate 12 so as to allow the mission block to be affixed to the mounting plate. The mission plate 14 provides a level stationary area on which to place a transmission or other device having an apertured shaft. The height of the mission plate 14 may be adjusted to ensure the apertured shaft 122 (shown in FIG. 13) is nestled properly in the shaft guide 48 (shown in FIG. 5) to facilitate press-fitting a pin into the apertured shaft 122.

Components of the press fixture 16 are depicted in FIGS. 5-6. The press fixture 16 includes a main block 40, depicted in FIG. 5. An alignment pin 60 for insertion into the main block 40 is depicted in FIG. 6. The main block 40 also includes mounting apertures 42 through which the main block 16 is attached to the mounting plate 12 by mechanical fasteners, pins, or other similar devices. The mounting apertures 42 extend vertically from the mounting surface 44 of the main block 40. Mechanical fasteners (not shown in the Figures) may be passed through apertures 28 in the mounting plate 12 and into the corresponding mounting apertures 42 to provide alignment and securely attach the main block 40 to the mounting plate 12.

An alignment pin guide 46 also extends vertically from the mounting surface 44 through the main block 40 into the shaft guide 48, decreasing in diameter in a stepped fashion as it approaches the shaft guide 48. The stepped alignment pin guide 46 is adapted to receive an alignment pin 60 (shown in FIG. 6). The alignment pin 60 includes a hemispherical tip 62 at a first end and a stop 64 at a second end. The hemispherical tip 62 allows the alignment pin to easily slide through the stepped alignment pin guide 46. As the diameter of the stop 64 is greater than the diameter of the stepped portion of the stepped alignment pin guide 46, the alignment pin 60 is prevented from exiting the stepped alignment pin guide 46 at the shaft guide 48.

The press fixture 16 is formed by insertion of the alignment pin 60 into the stepped alignment pin guide 46 of the main block 40. After insertion of the alignment pin 60, a spring 58 (shown in FIG. 2) or other similar resilient component is inserted into the stepped alignment guide 46 to contact the stop 64. The press fixture 40 is then mounted to the mounting plate 12 such that the spring 58 is located within the stepped alignment pin guide 46 and interposed between the stop 64 of the alignment pin 60 and the mounting plate 12. This spring loading of the alignment pin 60 causes the alignment pin 70 to extend upward into the shaft guide 48 when no downward force is applied to the alignment pin 60. When a downward force is applied to the alignment pin 60, the spring 58 compresses and allows the alignment pin 60 to retract either partially or completely into the stepped alignment guide 46. The stop 64 prevents the spring from forcing the alignment pin from the stepped alignment pin guide 44.

The U-shaped shaft guide 48 is located at substantially the centerline of the main block 40 and is shown to extend across the entirety of the main block 40. The function of the shaft guide 48 is to position, align, and support an apertured shaft 122 (shown in FIG. 13) into which a press-fit pin is to be placed. The shaft guide 48 can be adapted to accommodate various sizes of apertured shafts 122 by adjusting the width and depth of the shaft guide 48. In a like manner, the shape of the shaft guide 48 may be adjusted to accommodate apertured shafts 122 of various shapes.

Figure 14:
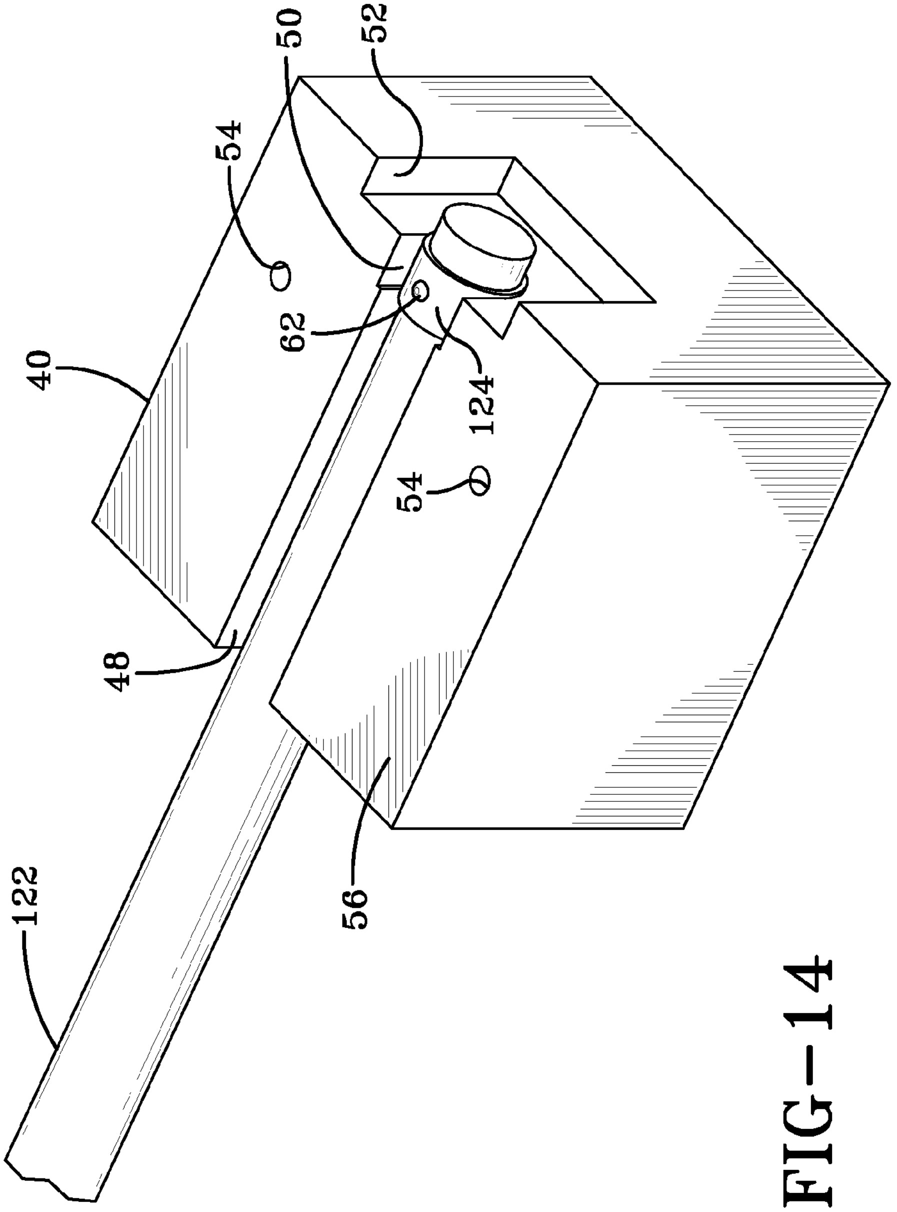
FIG. 14 is a perspective view of an apertured shaft and apertured guard locked into position in the shaft guide of the press fixture.

To facilitate the attachment of an apertured guard 124 (shown in FIG. 14) to an apertured shaft 122, the shaft guide 48 may have a contoured portion 50 at the end of the shaft guide 48 adjacent the mission plate 14. The contoured portion 50 provides position, support, and alignment to the apertured guard. It should be understood by those skilled in the art that the contoured portion 50 may be shaped to accommodate a variety of apertured guards, collars, hubs, or other similar workpieces. A recessed portion 52 may also be adapted to accommodate flanges or protrusions associated with either the apertured shaft or guard 122, 124.

Figure 10:
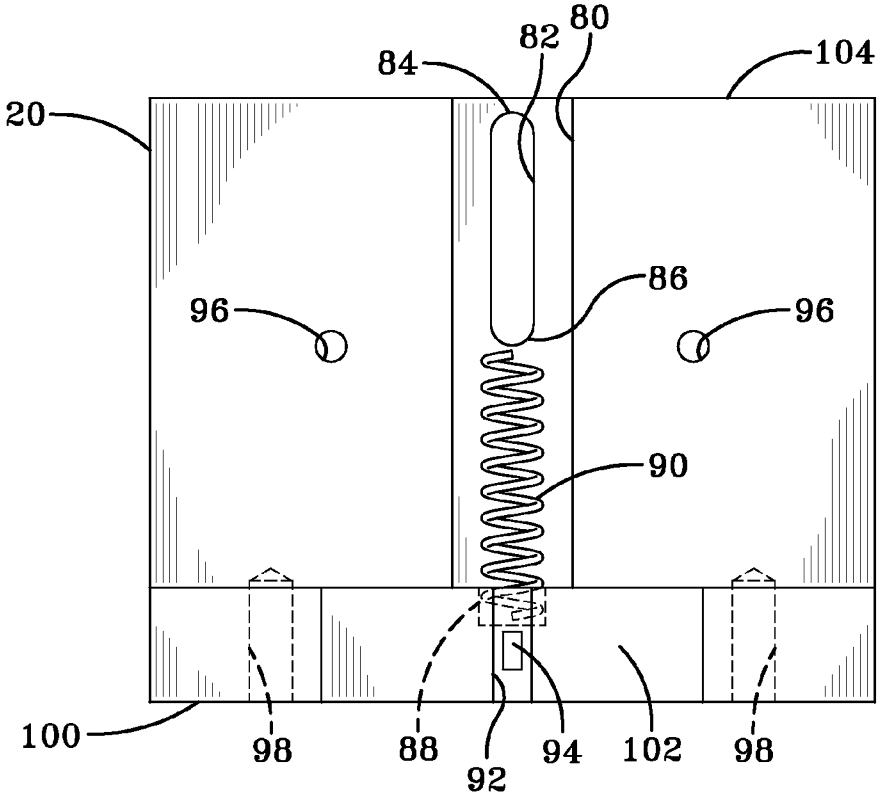
FIG. 10 is a front view of an exemplary embodiment of a pin block of the press block of FIG. 1.

Alignment bores 54 may be located in the top surface 56 of the main block 40. The alignment bores are positioned to correspond to alignment bores 98 on the mounting surface 100 of the pin block 20 (as shown in FIG. 10). Alignment may be facilitated by the use of press-fitted pins or other similar devices inserted into the alignment bores 54 and alignment bores 98. The alignment between the main block 40 and the pin block 20 ensures consistency in the press-fitting of the pins and minimizes movement between the press fixture 16 and the press head 18 during pressing.

Figure 7:
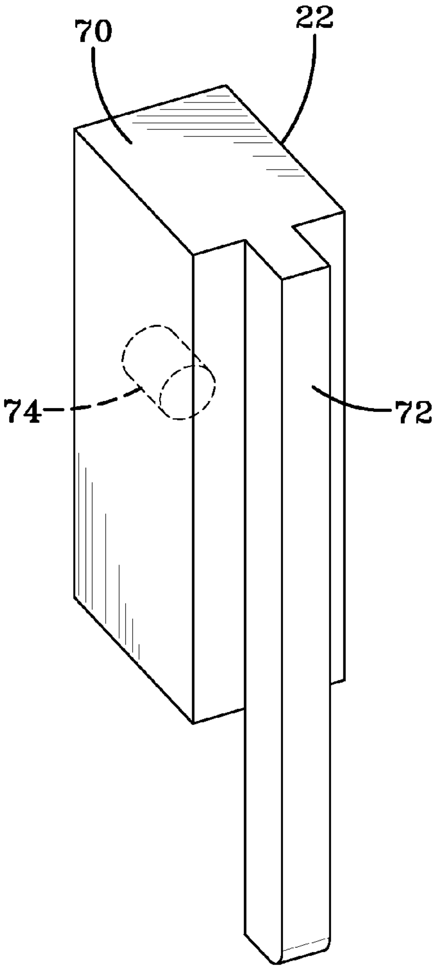
FIG. 7 is a perspective view of an exemplary embodiment of a pin pusher of the press block of FIG. 1.
Figure 8:
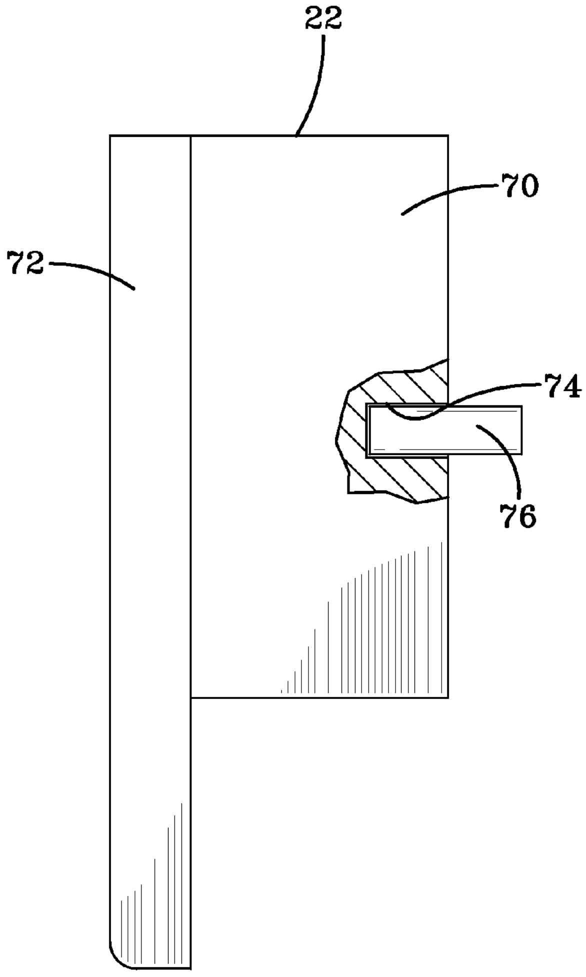
FIG. 8 is a side view of an exemplary embodiment of a pin pusher block of the press block of FIG. 1.

The aforementioned press head 18 includes a pin pusher 22 interposed between the pin block 20 and a cover plate 24. The pin pusher 22 of the exemplary press block 10 is depicted in FIGS. 7-8. The pin pusher 22 includes a unitary rectangular body portion 70 and a protrusion located at substantially the centerline thereof to form a pin pusher arm 72 that extends farther downward then the body portion. As shown in FIG. 8 a stop pin bore 74 is located on the side of the body portion 70 opposite the pin pusher arm 72. The stop pin bore 74 is adapted to receive a stop pin 76 that may be press-fit or otherwise secured therein. After insertion, the stop pin 76 remains partially extended from the body portion 70.

Figure 11:
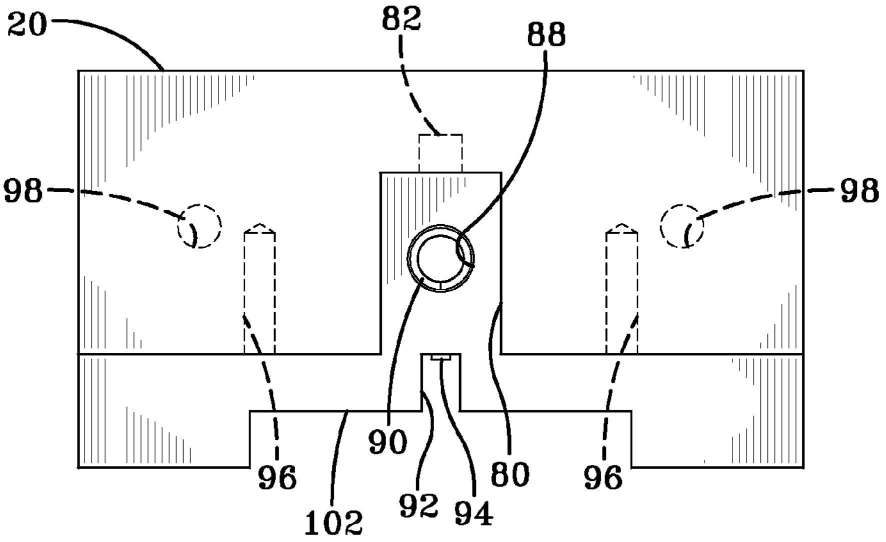
FIG. 11 is a top view of an exemplary embodiment of a pin block of the press block of FIG. 1.

The pin pusher 22 is then mated with the pin block 20. The pin block 20 of the exemplary press block 10 is depicted in FIGS. 9-11. The pin block 20 includes a mounting surface 100 and a stop surface 104 opposite the mounting surface 100. The pin block 20 further includes a vertical pin pusher guide slot 80 located at substantially the centerline of the pin block 20 and adapted to slidably receive the body portion 70 of the pin pusher 22. A stop pin channel 82 is located in a rear wall of the pin pusher guide 80, and includes a first terminal end 84 and a second terminal end 86. The stop pin channel 82 is adapted to receive the stop pin 76 extending from the body portion 70 of the pin pusher 22, while allowing the pin pusher 22 to travel vertically.

A spring retention bore 88 is located at the mounting end of the pin pusher guide 80 and is adapted to receive a spring 90 or other similar resilient component. As the pin pusher 22 is mated with the pin pusher guide 80, the spring 90 is interposed between the body portion 70 of the pin pusher 22 and the bore 88. The force exerted on the pin pusher 22 by the spring 90 forces the pin pusher 22 upward. This upward movement is limited by contact of the stop pin 76 with the first terminal end 84 of the stop pin channel 82.

The pin pusher 22 travels downward as force is applied in a downward direction to the pusher pin 22, compressing the spring 90. As the pin pusher 22 travels downward, the pin pusher arm 72 enters the pin guide 92. The pin guide 92 is located within a recessed portion 102. The recessed portion 102 is adapted to accommodate any flange or protrusion associated with an apertured shaft or guard 124, 122. The stop surface 104 of the pin block 20 provides a mechanical stop limiting the downward movement of a press 106 (shown in FIG. 2) or other device used to apply a downward force on the pin pusher 22. Therefore, the downward movement of the pin pusher 22 caused by the press 106 substantially terminates when its top surface reaches the stop surface 104 of the pin block 20 due to the upward force applied to the pin pusher by the compressed spring 90. The top surface of the pin pusher 22 thus remains substantially flush with the stop surface 104 of the pin block 18 while the press remains in contact therewith. These upward and downward forces on the pin pusher 22 ensure that the pin pusher arm 72 reaches a consistent depth for pin insertion. When the downward force is removed from the pin pusher 22, the spring 90 forces the pin pusher upward until the stop pin 76 reaches the first terminal end 84 of the stop pin channel 82.

In other exemplary embodiments, the combination of the stop pin 76 and the first and second terminal ends 84, 86 of the stop pin channel 82 may provide a mechanical stop limiting the vertical movement of the pin pusher 22. In such an embodiment, the downward movement of the pin pusher 22 is halted when the stop pin 76 reaches the second terminal end 86 of the stop pin channel 82. It should be understood by one skilled in the art that the positioning of the stop pin 76 in the pin pusher 22 and the length and positioning of the stop pin channel 82 may be adjusted to allow different pin pusher 22 travel distances and to adjust the depth that the pin pusher arm 72 travels into the pin guide 92.

The pin guide 92 includes a magnet 94 to hold a pin in the pin guide 92. The magnet 94 prevents the pin from falling out of the pin guide 94 during attachment of the press head 18 to the press fixture 16. As the pin pusher arm 72 travels into the pin guide 92, the pin pusher arm 72 engages the pin, forcing the pin downward.

Figure 12:
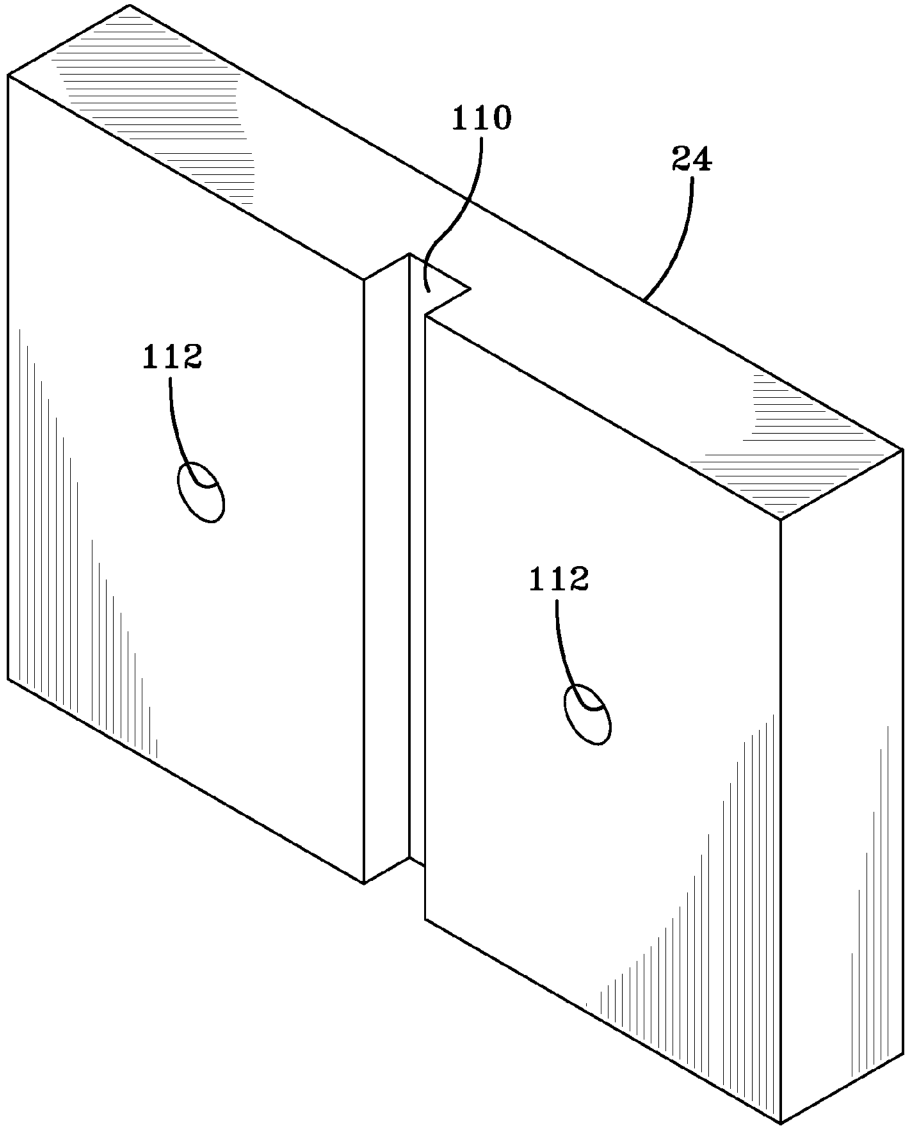
FIG. 12 is a perspective view of an exemplary embodiment of a cover plate of the press block of FIG. 1.

The pin block 22 includes holes 96 for the attachment of a cover plate 24. A cover plate 24 of the exemplary press block 10 is depicted in FIG. 12. The cover plate 24 includes a pin pusher arm guide 110 adapted to slidably receive the pin pusher arm 72. Two bores 112 are located in the cover plate 24 and correspond to holes 96 in the pin block 20. Attachment of the cover plate 24 secures the pin pusher 22 within the pin pusher channel 80, thereby forming the press head 18.

The press block 10 of the present invention is basically constructed as described above. Operation of the press block 10 is described below, with reference to FIGS. 13 and 14.

Figure 13:
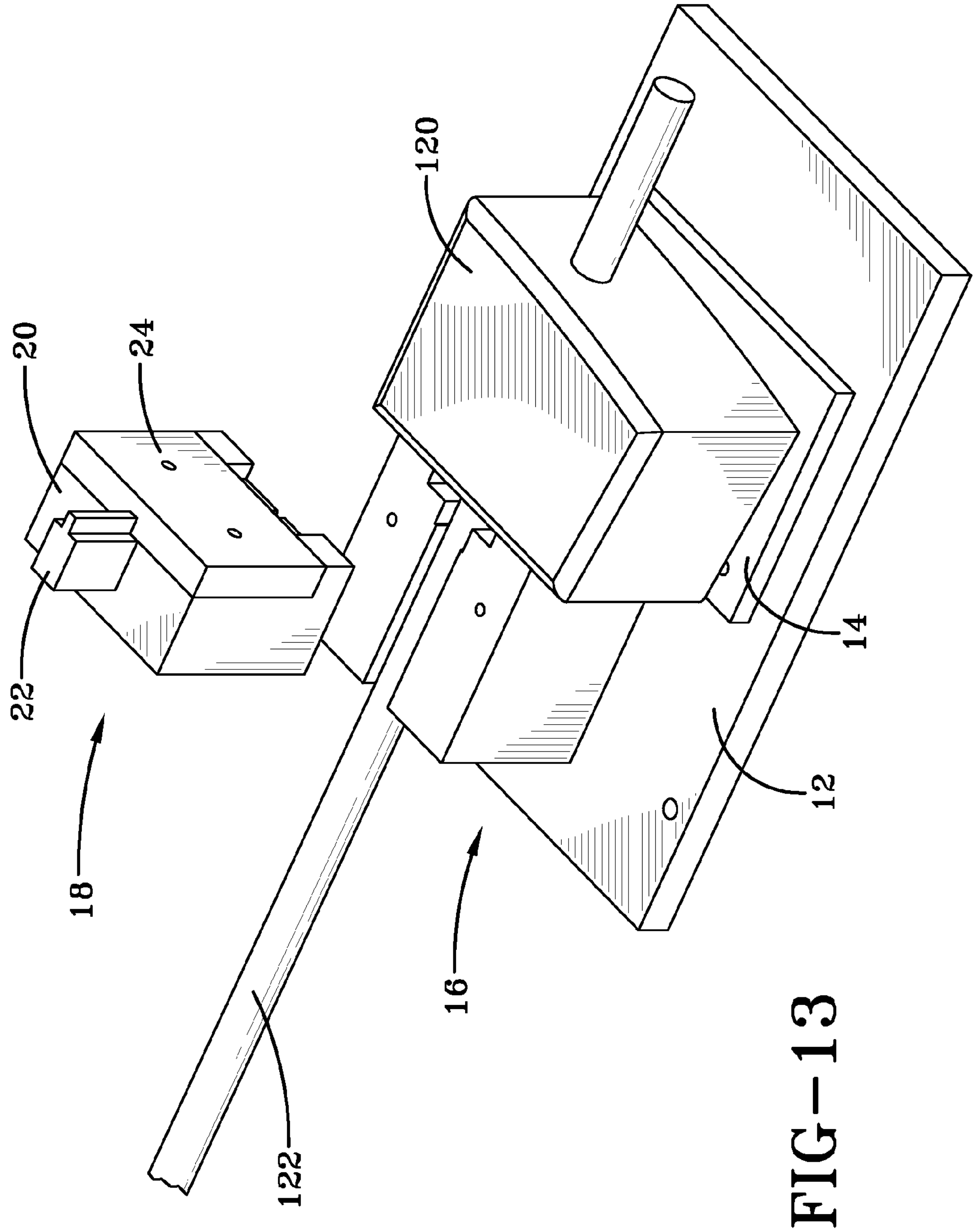
FIG. 13 is a perspective view of a workpiece having an apertured shaft mounted on the mission plate of FIG. 1.

The mission plate 14 and the press fixture 16 are attached to the mounting plate 12 adjacent to one another. As depicted in FIG. 13, a workpiece 120 having an apertured shaft 122 is placed on the mission plate 14. The apertured shaft 122 having an apertured guard 124 (see FIG. 14) rests in the shaft guide 48 and contoured portion 50 respectively. The apertured shaft 122 and the apertured guard 124 are adjusted so the apertures therein are aligned vertically. Once aligned vertically, the alignment pin 60 may pass completely through the vertically aligned apertures in the apertured shaft and guard 122, 124 locking the apertured shaft and guard into position.

After the apertured shaft and guard 122, 124 are locked into position by the spring loaded alignment pin 60, a pin to be pressed into the aligned apertures of the apertured shaft and guard is placed in the pin guide 92 and held in place by magnet 94. The press head 18 is then aligned and placed on the press fixture 16. A force is then applied to the extending pin pusher 22 by a press or other similar device. The force applied to the pin pusher 22 compresses the spring 90 and the pin pusher 22 travels downward. The pin pusher arm 72 travels downward and enters the pin guide 92, where it engages the pin and forces the pin into the vertically aligned apertures in the apertured guard and shaft 124, 122. This action of the pin pusher arm 72 compresses the spring 58 and forces the alignment pin 60 into the press fixture 16.

While certain embodiments of the present invention are described in detail above, the scope of the invention is not to be considered limited by such disclosure, and modifications are possible without departing from the spirit of the invention as evidenced by the following claims:

What is claimed is:

1. A press block device comprising:

a mounting plate;

a mission plate affixed to said mounting plate, the mission plate adapted to support a workpiece having an apertured shaft;

a press fixture affixed to said mounting plate adjacent said mission plate, said press fixture comprising a main block and an alignment pin, said main block adapted to receive and support an apertured shaft and an apertured guard so that apertures in said apertured shaft and apertured guard are vertically aligned, said alignment pin adapted for insertion into said vertically aligned apertures of said apertured shaft and apertured guard; and a press head removably mounted to said press fixture, said press head adapted and positioned to contact a pin provided for insertion into said vertically aligned apertures in said apertured shaft and apertured guard;

whereby, when downward force is applied to said press head, said pin is forced downward into said vertically aligned apertures in said apertured shaft and apertured guard, thereby displacing said alignment pin.

2. The press block device of claim 1, wherein said alignment pin passes through said main block and extends into said vertically aligned apertures of said apertured shaft and apertured guard.

3. The press block device of claim 1, further comprising a spring interposed between said alignment pin and said mounting plate, said spring forcing said alignment pin to extend into said vertically aligned apertures of said apertured shaft and apertured guard.

4. The press block device of claim 1, wherein said press head further includes:

a pin block including a stop surface and a pin pusher guide slot disposed therein for receiving a pin pusher, said pin pusher guide slot directing vertical movement of said pin pusher, said stop surface adapted to terminate downward movement of a press used to apply a downward force to said pin pusher; and a cover plate removably attached to said pin block so as to trap said pin pusher between said pin block and said cover plate.

5. The press block device of claim 4, wherein said pin pusher further comprises a pin pusher arm extending downward beyond a body portion of said pin pusher, said pin pusher arm adapted to engage said pin for insertion thereof into said vertically aligned apertures in said apertured shaft and apertured guard.

6. The press block device of claim 5, wherein said pin block further comprises a spring retention bore located at a mounting end of said pin pusher guide slot.

7. The press block device of claim 6, further comprising a spring interposed between said body portion of said pin pusher and said spring retention bore, said spring forcing said pin pusher to extend upwardly beyond said pin block such that when downward force is applied to said pin pusher said spring is compressed and said pin pusher travels downward in said pin pusher guide slot until the downward press movement is terminated by said stop surface.

8. The press block device of claim 5, wherein said pin block further comprises a pin guide adapted to hold a pin for insertion into said vertically aligned apertures in said apertured shaft and apertured guard.

9. The press block of claim 8, wherein said pin is held in said pin block by a magnet.

10. An apparatus for installing a pin to an aligned guard/shaft assembly, comprising:

- a mounting plate;
- a mission plate affixed to said mounting plate, said mission plate adapted to support a workpiece having an apertured shaft;
- a press fixture affixed to said mounting plate adjacent said mission plate, said press fixture comprising a main block and an alignment pin, said main block adapted to receive and support an apertured shaft and an apertured guard so that apertures in the apertured shaft and apertured guard are vertically aligned, said alignment pin adapted for insertion into said vertically aligned apertures of said apertured shaft and apertured guard; and
- a press head removably mounted to said press fixture, said press head further comprising:
  - a pin block including a stop surface and a pin pusher guide slot disposed therein for receiving a pin pusher, said pin pusher guide slot directing vertical movement of said pin pusher, said stop surface adapted to terminate downward movement of a press used to apply a downward force to said pin pusher; and
  - a cover plate removably attached to said pin block so as to trap said pin pusher between said pin block and said cover plate;
  - wherein, said pin pusher is adapted and positioned to contact a pin for insertion into said vertically aligned apertures in said apertured shaft and apertured guard;
  - whereby, when downward force is applied to said pin pusher by said press, said pin is forced downward into said vertically aligned apertures in said apertured shaft and apertured guard, thereby displacing said alignment pin.

11. The apparatus of claim 10, wherein said alignment pin passes through said main block and extends into said vertically aligned apertures of said apertured shaft and apertured guard.

12. The apparatus of claim 10, further comprising a spring interposed between said alignment pin and said mounting plate, said spring forcing said alignment pin to extend into said vertically aligned apertures of said apertured shaft and apertured guard.

13. The apparatus of claim 10, wherein said pin pusher is spring loaded such that said pin pusher extends upwardly beyond said pin block when no downward force is applied to said pin pusher and, when a downward force is applied to said pin pusher, said pin pusher travels downward in said pin pusher guide slot until said downward press movement is terminated by said stop surface.

14. The apparatus of claim 10, wherein said pin block further comprises a pin guide adapted to hold a pin for insertion into said vertically aligned apertures in said apertured shaft and apertured guard.

15. The apparatus of claim 14, wherein said pin pusher further comprises a pin pusher arm extending downwardly beyond a body portion of the said pin pusher, said pin pusher arm adapted to extend into the said pin guide and engage said pin for insertion into said vertically aligned apertures in said apertured shaft and apertured guard.

16. The apparatus of claim 14, wherein said pin is held in said pin block by a magnet.

17. An apparatus for installing a pin to an aligned guard/shaft assembly, comprising:

- a mounting plate;
- a mission plate affixed to said mounting plate, the mission plate adapted to support a workpiece having an apertured shaft;
- a press fixture mounted to said mounting plate, said press fixture including a spring-loaded alignment pin and a shaft guide having a contoured end portion, said shaft guide adapted to receive and support said apertured shaft and an apertured guard so that apertures therein are vertically aligned, said spring loaded alignment pin adapted to extend vertically from said press fixture into said shaft guide for insertion into said vertically aligned apertures in said apertured shaft and apertured guard;
- a press head removably attached to said press fixture, said press head adapted and positioned to contact a pin for insertion into said vertically aligned apertures in said apertured shaft and aperture guard;
- whereby, when a downward force is applied to said press head, said pin is forced downward into said vertically aligned apertures in said apertured shaft and apertured guard, thereby displacing said alignment pin.

18. The apparatus of claim 17, wherein said press head further includes:

- a pin block including a stop surface and a pin pusher guide slot disposed therein for receiving a pin pusher, said pin pusher guide slot directing vertical movement of said pin pusher, said stop surface adapted to terminate downward movement of a press used to apply a downward force to said pin pusher; and
- a cover plate removably attached to said pin block so as to trap said pin pusher between said pin block and said cover plate.

19. The apparatus of claim 18, wherein said pin block further comprises a pin guide adapted to hold a pin for insertion into said vertically aligned apertures in said apertured shaft and apertured guard.

20. The apparatus of claim 19, wherein said pin is held in said pin block by a magnet.

21. The apparatus of claim 18, wherein said pin pusher is spring loaded such that said pin pusher extends upward beyond said pin block when no downward force is applied to said pin pusher and, when a downward force is applied to said pin pusher, said pin pusher travels downward in said pin pusher guide slot until said downward press movement is terminated by said stop surface.

* * * * *